Figure 1:
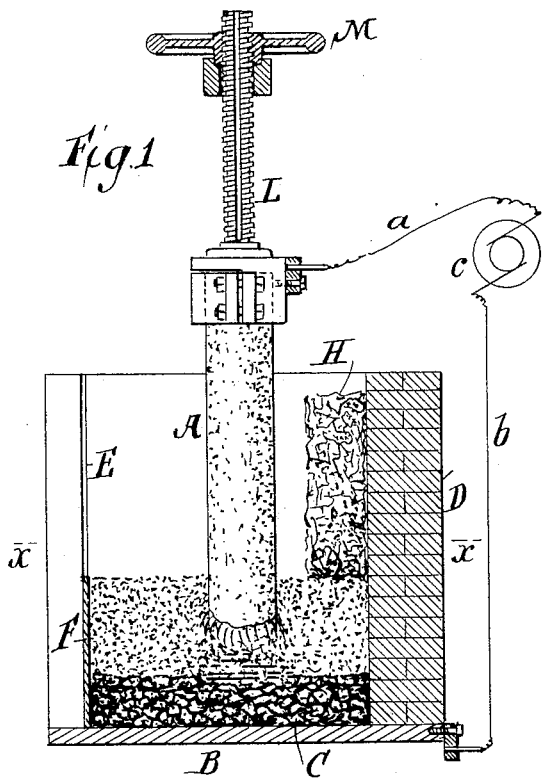

(No Model.)

J. T. MOREHEAD.
MANUFACTURE OF CARBID OF CALCIUM.

No. 583,498. Patented June 1, 1897.

WITNESSES:
Geo. Wadman
H. Coutant

INVENTOR
James Turner Morehead
BY E. N. Dickers
ATTORNEY

UNITED STATES PATENT OFFICE.

JAMES TURNER MOREHEAD, OF SPRAY, NORTH CAROLINA, ASSIGNOR TO THE ELECTRO GAS COMPANY, OF WEST VIRGINIA.

MANUFACTURE OF CARBID OF CALCIUM.

SPECIFICATION forming part of Letters Patent No. 583,498, dated June 1, 1897.

Application filed February 20, 1896. Serial No. 580,084. (No model.)

*To all whom it may concern:*

Be it known that I, JAMES TURNER MOREHEAD, of Spray, Rockingham county, North Carolina, have invented certain new and useful Improvements in the Manufacture of Carbid of Calcium, of which the following is a specification.

The object of my improvement is to render more convenient and inexpensive the production of carbid of calcium, which, as is well known, may be formed by subjecting a mixture of lime and carbon to a high degree of heat in an electric furnace, the lime being decomposed and the carbon uniting with the metallic calcium to form the carbid.

In carrying my invention into effect I use an electric furnace in which the electrodes are vertically disposed to each other, and in order to prevent the excessive heating of the upper electrode which has heretofore been experienced where vertical electrodes are employed I keep the lower end of the upper electrode approximately at or about the level of the upper edge of the furnace-wall, so that its body is at all times above and outside of the furnace and out of contact with the material under treatment, as I am enabled to do by the means hereinafter described. At the same time in order to further facilitate the formation of the carbid and its removal from the furnace I so charge the furnace with the material to be treated that only the central part of it is subjected to a decomposing temperature, the remainder being highly heated, but remaining in the granular state between the carbid formed and the furnace-wall. To these ends the lower electrode, which forms a portion of the bottom of the furnace, is set in a suitable bed which may be simply a piece of sheet-iron. The upper electrode is suspended above the lower in any usual or suitable manner and provided with any usual or suitable mechanism for bringing it in contact with the lower electrode and separating it therefrom when required. Around the lower electrode I construct a wall of which part is variable in height. In practice the front of the furnace is made variable in height, preferably by movable metallic sheets, as of iron, which may be raised to different heights. This inclosure I then fill or nearly fill with the material to be treated, consisting of pulverized lime and carbon in the proportion of substantially twenty parts of lime to twelve parts of carbon. The electrodes being brought in contact, current is then turned on, and upon separating the electrodes an intense heat is developed between them, by which the lime is decomposed and the carbon combines with the metallic calcium, forming carbid of calcium.

When the decomposition of the material between the electrodes has been nearly or quite effected, the wall of the furnace is raised by adding another tier of the wall material, the electrodes are further separated by raising the upper one, and a fresh charge of material is thrown into the furnace on top of that already treated. This process of building up the wall, separating the electrodes, and adding fresh charges of material is continued until the furnace has reached as great a height as is convenient or where the resistance between the electrodes cannot be increased without inconvenience when the current is turned off. In this manner a column of carbid is built up, resting on the lower electrode, which constitutes a practical extension of such electrode as the operation progresses. The material which is outside of the circumference of the electrode, not being exposed to such intense heat as that immediately between the electrodes, will not be decomposed, but will remain as a layer of granular material around the carbid and interposed between it and the wall of the furnace.

The loose furnace-wall is removed as soon as the carbid has sufficiently hardened, permitting the undecomposed material to fall away, when the carbid is easily removed, and the operation is repeated.

By reason of the layer of granular material interposed between the wall of the furnace and the carbid, which until partially cooled is in a soft state, any sticking of the carbid to the walls of the furnace is prevented, and its removal from the furnace is facilitated. By keeping the lower end of the upper electrode always near the upper edge of the furnace-wall the hot gases generated in the furnace are permitted to escape without coming in contact with the body of the electrode, the life of which is thus prolonged.

The invention will be better understood by reference to the accompanying drawings, forming a part hereof, in which—

Figure 2:
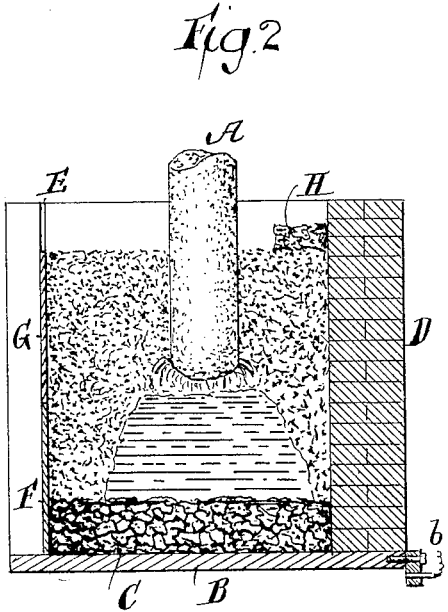
Figure 3:
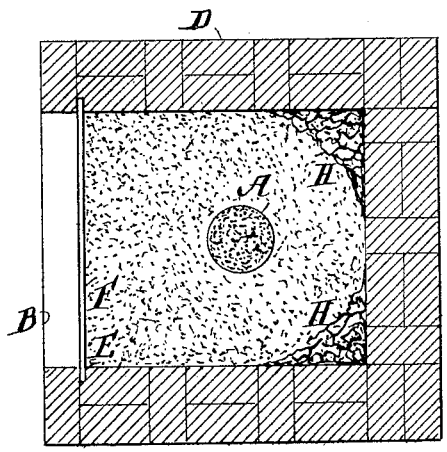

Figure 1 shows a vertical section of the furnace as it appears at the beginning of the operation. Fig. 2 is a vertical elevation of part of the furnace as it appears toward the close of the operation, and Fig. 3 a section through Fig. 1 on the line $x$ $x$.

A is the upper and B the lower electrode, of which the upper electrode is preferably made of carbon. The lower electrode may be a metal plate having upon it a carbon hearth C and electrodes which are connected by any suitable conductors, such as $a$ $b$, with a suitable dynamo $c$ or other source of electric energy. The furnace itself, as shown, consists of a surrounding chamber of brick D, inclosing three sides of the furnace. The bricks on the fourth side may be provided with slot E, in which a retainer or retainers F G may be placed. The object of these retainers is to hold in and support the material to be converted as the pencil of the electrode is raised and additional supply being fed—as, for instance, of coke and lime, when the calcium carbid is formed. The inclosure may be made approximately circular by filling in the corners with carbon H. The carbon electrode A can be raised in any suitable way—as, for instance, by the screw L and hand-wheel M.

In carrying out the operation an inclosure may first be made having its upper edge at a lower level, as shown, for instance, in Fig. 1. This inclosure is then filled with a charge of the mixture of pulverized lime and carbon to be treated, and the current is caused to pass between the electrodes, which are sufficiently separated, so that that portion of the charge lying upon the electrode C will be subjected to a decomposing temperature. When the decomposition of this initial charge has been substantially effected, an additional charge of the material to be treated is thrown into the inclosure and the electrodes are still farther separated. The inclosing wall may be simultaneously built up, as shown in Fig. 2. When the mass of carbid has been built up to as great a height as is convenient, or when the electrodes have become so far separated that the resistance between them is as great as is desirable, the current is turned off, when the wall F G may be taken down and the carbid removed. It will be observed that the lower end of the upper electrode is by this building-up process caused to project only a comparatively short distance into the mingled lime and carbon; also, that the confining-wall of the furnace may be increased in height as the combination progresses.

The undecomposed layer of material between the carbid formed and the furnace-wall prevents any adhesion of the newly-formed carbid to the wall of the furnace, which is thus readily removed, and the granular material, falling down as the wall is removed, is ready to be again thrown into the furnace as a part of a subsequent charge. Being already highly heated, it is in better condition to be treated than when put in the furnace in a cold state, so that I thus utilize the otherwise waste heat of the furnace.

As the carbid formed retains its heat for a considerable period, the removal of the hot mass from the furnace is greatly facilitated by the taking down of the furnace-wall after the formation of the carbid is completed, as the carbid will then cool more rapidly and can be easily grappled and carried away.

It is evident that the invention herein claimed can be applied to the manufacture of other material than carbid of calcium, and I therefore do not limit my claims to the manufacture of carbid of calcium alone.

What I claim as new, and desire to secure by Letters Patent, is—

1. The hereinbefore-described improvement in the manufacture of carbid of calcium, which consists in building up the furnace-wall as the formation of the carbid progresses, adding fresh charges of the material to be treated as the wall is built up and keeping the lower end of the upper electrode at all times near the upper edge of the furnace-wall, substantially as described.

2. In the process of manufacturing carbid of calcium in an electric furnace having vertical electrodes, the hereinbefore-described method of preventing the heating of the upper electrode which consists in building up the furnace-wall as the electrodes are separated, whereby the body of the upper electrode is kept above the furnace-wall, substantially as described.

3. The hereinbefore-described improvement in the manufacture of carbid of calcium, which consists in subjecting mingled lime and carbon to a decomposing temperature between vertical electrodes, adding fresh charges of material from time to time, as required, to continue the operation, building up a retaining-wall, as required, to hold in place the material added, and finally removing such wall, substantially as and for the purpose set forth.

4. The hereinbefore-described improvement in the manufacture of carbid of calcium, which consists in forming around the lower of two vertically-disposed electrodes, an inclosure greater in diameter than such electrode, charging into such inclosure the material to be treated and subjecting it to a decomposing temperature by means of an electric current between such electrodes, adding fresh charges of material and separating the electrodes as required to continue the operation, and building up the wall of the inclosure as required to contain the material added, substantially as described.

In testimony whereof I have signed my name to this specification in the presence of two subscribing witnesses.

JAMES TURNER MOREHEAD.

Witnesses:
 H. COUTANT,
 ANTHONY GREF.